(12) United States Patent
Abhinav et al.

(10) Patent No.: US 12,159,204 B2
(45) Date of Patent: *Dec. 3, 2024

(54) MULTI-DIMENSIONAL MODEL SHAPE TRANSFER

(71) Applicant: Accenture Global Solutions Limited, Dublin (IE)

(72) Inventors: Kumar Abhinav, Hazaribag (IN); Alpana A. Dubey, Bangalore (IN); Suma Mani Kuriakose, Mumbai (IN); Devasish Mahato, Jamshedpur (IN)

(73) Assignee: Accenture Global Solutions Limited, Dublin (IE)

( * ) Notice: Subject to any disclaimer, the term of this patent is extended or adjusted under 35 U.S.C. 154(b) by 976 days.

This patent is subject to a terminal disclaimer.

(21) Appl. No.: 17/166,089

(22) Filed: Feb. 3, 2021

(65) Prior Publication Data

US 2022/0245510 A1    Aug. 4, 2022

(51) Int. Cl.
*G06N 20/00* (2019.01)
*G06F 17/18* (2006.01)
*G06T 17/00* (2006.01)

(52) U.S. Cl.
CPC ............ *G06N 20/00* (2019.01); *G06F 17/18* (2013.01); *G06T 17/00* (2013.01)

(58) Field of Classification Search
CPC .......... G06N 20/00; G06N 3/045; G06N 3/08; G06F 17/18; G06T 17/00; G06T 2219/2021; G06T 2219/2024; G06T 19/20

See application file for complete search history.

(56) References Cited

U.S. PATENT DOCUMENTS

| 7,728,843 B2 | 6/2010 | Maillot et al. |
| 8,266,519 B2 | 9/2012 | Verma et al. |

(Continued)

FOREIGN PATENT DOCUMENTS

| CN | 103443787 | 12/2013 |
| CN | 107436976 | 12/2017 |

(Continued)

OTHER PUBLICATIONS

Anny Yuniarti, Nanik Suciati, "A Review of Deep Learning Techniques for 3D Reconstruction of 2D Images", 2019, IEEE (Year: 2019).*

(Continued)

*Primary Examiner* — Hope C Sheffield
(74) *Attorney, Agent, or Firm* — Polsinelli PC

(57) ABSTRACT

Implementations are directed to processing a content object model through a ML model to provide a set of base content feature representations, processing a style object model through the ML model to provide a set of base style feature representations, executing iterations including: generating, by the ML model, a set of stylized feature representations for an initial stylized object model, the initial stylized object model having one or more adjusted parameters relative to a previous iteration, determining a total loss based on the set of stylized feature representations, the set of base content feature representations, and the sets of base style feature representations, and determining that the total loss is non-optimized, and in response, initiating a next iteration, executing an iteration including determining that the total loss is optimized, and in response providing the initial stylized object model as output of the iterative process.

24 Claims, 8 Drawing Sheets

(56) References Cited

U.S. PATENT DOCUMENTS

| | | |
|---|---|---|
| 8,271,870 B2 | 9/2012 | Verma et al. |
| 8,412,516 B2 | 4/2013 | Verma et al. |
| 8,442,985 B2 | 5/2013 | Verma et al. |
| 8,566,731 B2 | 10/2013 | Subramanian et al. |
| 8,671,101 B2 | 3/2014 | Verma et al. |
| 8,677,313 B2 | 3/2014 | Sharma et al. |
| 8,843,819 B2 | 9/2014 | Verma et al. |
| 9,015,011 B2 | 4/2015 | Sarkar et al. |
| 9,183,194 B2 | 11/2015 | Verma et al. |
| 9,384,187 B2 | 7/2016 | Verma et al. |
| 9,400,778 B2 | 7/2016 | Ramani et al. |
| 9,519,986 B1 | 12/2016 | Kolliopoulos et al. |
| 9,535,982 B2 | 1/2017 | Verma et al. |
| 10,535,164 B2 | 1/2020 | Shlens et al. |
| 10,769,764 B2 | 9/2020 | Fang et al. |
| 10,950,021 B2 | 3/2021 | Dubey et al. |
| 11,074,532 B1 | 7/2021 | Kennell et al. |
| 11,244,484 B2 | 2/2022 | Dubey et al. |
| 11,455,552 B2 | 9/2022 | Liongosari et al. |
| 2006/0173874 A1 | 8/2006 | Chen et al. |
| 2011/0123100 A1 | 5/2011 | Carroll et al. |
| 2014/0351694 A1 | 11/2014 | Verma et al. |
| 2016/0165012 A1 | 6/2016 | Li et al. |
| 2016/0300252 A1 | 10/2016 | Frank et al. |
| 2017/0076179 A1 | 3/2017 | Martineau et al. |
| 2017/0116373 A1 | 4/2017 | Ginsburg et al. |
| 2018/0075104 A1 | 3/2018 | Oberbreckling et al. |
| 2018/0075602 A1 | 3/2018 | Shen et al. |
| 2018/0082715 A1 | 3/2018 | Rymkowski et al. |
| 2018/0146257 A1 | 5/2018 | Seo et al. |
| 2019/0114699 A1 | 4/2019 | Cook et al. |
| 2019/0228587 A1* | 7/2019 | Mordvintsev ........... G06T 19/20 |
| 2019/0236814 A1 | 8/2019 | Shlens et al. |
| 2019/0244329 A1 | 8/2019 | Li et al. |
| 2019/0251616 A1 | 8/2019 | Yankovich et al. |
| 2019/0259470 A1 | 8/2019 | Olafson et al. |
| 2019/0318222 A1 | 10/2019 | Mallela |
| 2019/0325008 A1 | 10/2019 | Dubey et al. |
| 2019/0325088 A1* | 10/2019 | Dubey ................ G06T 11/001 |
| 2019/0325628 A1 | 10/2019 | Dubey et al. |
| 2019/0392192 A1 | 12/2019 | Dubey et al. |
| 2020/0082578 A1 | 3/2020 | Shlens et al. |
| 2020/0090318 A1 | 3/2020 | Azoulay et al. |
| 2020/0117348 A1 | 4/2020 | Jang et al. |
| 2020/0130936 A1 | 4/2020 | Shekhawat et al. |
| 2020/0151521 A1 | 5/2020 | Almazan et al. |
| 2020/0193222 A1 | 6/2020 | Singh et al. |
| 2020/0219111 A1 | 7/2020 | Nair et al. |
| 2020/0226651 A1 | 7/2020 | Rachidi et al. |
| 2020/0242111 A1 | 7/2020 | Oberbreckling et al. |
| 2020/0242330 A1* | 7/2020 | Blondel ............... G06V 20/647 |
| 2020/0250557 A1 | 8/2020 | Kishimoto et al. |
| 2020/0312042 A1 | 10/2020 | Sardari et al. |
| 2020/0320288 A1 | 10/2020 | Kunnumma et al. |
| 2020/0365239 A1 | 11/2020 | Sabharwal et al. |
| 2021/0142478 A1 | 5/2021 | Abhinav et al. |
| 2021/0158180 A1 | 5/2021 | Liongosari et al. |
| 2021/0264520 A1 | 8/2021 | Cummings |
| 2021/0279967 A1 | 9/2021 | Gernoth et al. |
| 2021/0319039 A1 | 10/2021 | Gerber, Jr. et al. |
| 2021/0319173 A1 | 10/2021 | Gerber, Jr. et al. |
| 2021/0350621 A1 | 11/2021 | Bailey et al. |
| 2021/0365488 A1 | 11/2021 | Chen et al. |
| 2021/0365599 A1 | 11/2021 | Martelaro et al. |
| 2022/0122173 A1 | 4/2022 | Lopatin et al. |
| 2022/0245908 A1 | 8/2022 | Abhinav et al. |

FOREIGN PATENT DOCUMENTS

| | | |
|---|---|---|
| EP | 2081118 | 7/2009 |
| EP | 2296094 | 3/2011 |
| EP | 2362333 | 8/2011 |
| WO | WO 2012106133 | 8/2012 |

OTHER PUBLICATIONS

Ahmed et al., "EPN: Edge-Aware PointNet for Object Recognition form Multi-View 2.5D Point Clouds," Proceedings of the IEEE/RSJ International Conference on Intelligent Robots and Systems, Nov. 3-8, 2019, Macau, China, 7 pages.

Chang et al., "ShapeNet: An Information-Rich 3D Model Repository," arXiv, Dec. 9, 2015, arXiv:1512.03012v1, 11 pages.

Feng et al., "MeshNet: Mesh Neural Network for 3D Shape Representation," arXiv, Nov. 28, 2018, arXiv:1811.11424v1, 9 pages.

Gatys et al., "A Neural Algorithm of Artistic Style," arXiv, Aug. 26, 2015, arXiv:1508.06576v1, 16 pages.

Hanocka et al., "MeshCNN; A Network with an Edge," ACM Trans. Graphics, Feb. 2019, 1(1):90, 12 pages.

He et al., "GeoNet: Deep Geodesic Networks for Point Cloud Analysis," arXiv, Jan. 3, 2019, arXiv:1901.00680v1, 11 pages.

Li et al., "A closed-form solution to photorealistic image stylization," The European Conference on Computer Vision (ECCV), Munich, Germany, Sep. 8-14, 2018, 23 pages.

Mazeika et al., "Towards 3D Neural Style Transfer," Proceedings of the AAAI Conference on Artificial Intelligence and Interactive Digital Entertainment, Nov. 13-17, 2018, Edmonton, Alberta, Canada, 7 pages.

Mo et al., "PartNet: A Large-scale Benchmark for Fine-grained and Hierarchical Part-level 3D Object Understanding," Proceedings of the 2019 IEEE/CVF Conference on Computer Vision and Pattern Recognition (CPVR), Jun. 16-20, 2019, Long Beach, California, USA, 909-918.

Pham et al., "SceneCut: Joint Geometric and Object Segmentation for Indoor Scenes", May 24, 2018, arXiv:1709.07158v2, 8 pages.

PointClouds.org [online], "pel::StatisticalOutlierRemoval<PointT> Class Template Reference," available on or before Aug. 8, 2020, via Internet Archive: Wayback Machine URL<https://web.archive.org/web/20200808065826/https://pointclouds.org/documentation/classpel_1_1_statistical_outlier_removal.html>, retrieved on Feb. 4, 2021, retrieved from URL<https://pointclouds.org/documentation/classpcl_1_1_statistical_outlier_removal.html>, 7 pages.

PointClouds.org [online], "radius_outlier_removal.h," upon information and belief, available no later than Dec. 17, 2020, retrieved on Feb. 4, 2021, retrieved from URL<https://pointclouds.org/documentation/radius_outlier_removal_8h_source.html>, 5 pages.

Princeton.edu [online], "Princeton ModelNet," available on or before Mar. 9, 2015 via Internet Archive: Wayback Machine URL<https://web.archive.org/web/20150309054238/https://modelnet.cs.princeton.edu/download.html>, retrieved on Nov. 6, 2020, retrieved from URL<https://modelnet.cs.princeton.edu/download.html>, 3 pages.

Qi et al., "PointNet: Deep Learning on Point Sets for 3D Classification and Segmentation," arXiv, Apr. 10, 2017, arXiv:1612.00593v2, 19 pages.

Qi et al., "PointNet++: Deep Hierarchical Feature Learning on Point Sets in a Metric Space," arXiv, Jun. 7, 2017, arXiv:1706.02413v1, 14 pages.

Szegedy et al., "Going deeper with convolutions," arXiv, Sep. 17, 2014, arXiv:1409.4842v1, 12 pages.

Szegedy et al., "Inception-v4, Inception-ResNet and the Impact of Residual Connections on Learning," arXiv, Aug. 23, 2016, arXiv:1602.07261v2, 12 pages.

Szegedy et al., "Rethinking the Inception Architecture for Computer Vision," arXiv, Dec. 11, 2015, arXiv:1512.00567v3, 10 pages.

Wu et al., "3D ShapeNets: A Deep Representation for Volumetric Shapes," Proceedings of the 2015 IEEE Conference on Computer Vision and Pattern Recognition (CPVR), Jun. 7-12, 2015, Boston, Massachusetts, USA, 1912-1920.

Pinquie, Romain et al., "A Property Graph Data Model for a Context-Aware Design Assistant", Feb. 2020. (Year: 2020).

Yan, Hehua et al., "KnowIME: A System to Construct a Knowledge Graph for Intelligent Manufacturing Equipment", Mar. 11, 2020, Advances in Machine Learning and Cognitive Computing for Industry Applications, IEEE Access. (Year: 2020).

Cao et al., "Neural Style Transfer for Point Clouds", 2019, arXiv (Year: 2019).

(56) References Cited

OTHER PUBLICATIONS

Gatesy et al. "Scientific Rotoscoping: A Morphology-Based Method of 3-D Motion Analysis and Visualization", 2010, Wiley-Liss, Inc. (Year: 2010).
Miranda Nicole Shaw, "Lumbar Spine Endplate Biomechanics: An Experimental and Modeling Approach", 2010, ProQuest LLC (Year: 2010).
Teimourzadeh et al., "A three-dimensional group search optimization approach for simultaneous planning of distributed generation units and distribution network reconfiguration", 2019, Applied Soft Computing Journal (Year: 2019).
Anny Yuniarti, Nanik Suciati, "A Review of Deep Learning Techniques for 3D Reconstruction of 2D Images", 2019, IEEE (Year: 2019).

\* cited by examiner

MULTI-DIMENSIONAL MODEL SHAPE TRANSFER

BACKGROUND

Product lifecycles can include multiple processes. Example processes can include, without limitation, a design process, a testing process, and a production process. Each process can include one or more phases. For example, an example design process can include a requirements phase, a design phase, an evaluation phase, and a prototyping phase. In the design phase, a product is designed. Example products can include individual objects (e.g., chair, couch, table) and spaces (e.g., room, vehicle interior). Designs can include wholly original designs, combinations of existing designs, and derivatives of existing designs.

In modern design processes, much of the design process is performed using computers and design information stored as data (e.g., multi-dimensional models, images). For example, a designer can use computer-executable design tools to generate designs represented in digital files (e.g., model files, image files). The design process, however, can be a tedious, iterative process as the designer seeks to capture an appealing design. This can include both the shape of objects as well as styles applied to objects. Consequently, the design process can place a significant demand on resources, such as processors and memory, as the designer iterates over multiple designs.

SUMMARY

Implementations of the present disclosure are generally directed to computer-implemented systems for assisting in product design phases. More particularly, implementations of the present disclosure are directed to a computer-implemented intelligent design platform for assisting in design phases of products. In some implementations, the intelligent design platform of the present disclosure includes multi-dimensional model style transfer that enables a shape of a style object to be at least partially applied to content of a content object in a stylized object. In some examples, the style transfer includes applying at least a portion of a style (e.g., shape) of the style object to the content of the content object. In some examples, the style object is represented as a multi-dimensional style object model and the content object is represented as a multi-dimensional content object model. In some examples, at least a portion of the shape of the style object, as represented in the multi-dimensional style object model, is applied to content of the multi-dimensional content object model to provide the multi-dimensional stylized object model.

In some implementations, actions include processing a content object model through a machine learning (ML) model to provide a set of base content feature representations, processing a style object model through the ML model to provide a set of base style feature representations, executing two or more iterations of an iterative process, each of the two or more iterations including: generating, by the ML model, a set of stylized feature representations for an initial stylized object model, the initial stylized object model having one or more adjusted parameters relative to a previous iteration, determining a total loss based on the set of stylized feature representations, the set of base content feature representations, and the sets of base style feature representations, and determining that the total loss is non-optimized, and in response, initiating a next iteration, executing an iteration of the iterative process, the iteration including determining that the total loss is optimized, and in response providing the initial stylized object model as output of the iterative process, and denoising the initial stylized object model to provide a stylized object model representing a stylized object comprising at least a portion of content of the content object model and at least a portion of a shape of the style object model. Implementations of the present disclosure also include corresponding systems, apparatus, and computer programs, configured to perform the actions of the methods, encoded on computer storage devices.

These and other implementations can each optionally include one or more of the following features: the set of base content feature representations includes local feature representations output by a layer of the ML model; the set of stylized feature representations includes a local feature representation for each of a plurality of layers of the ML model; the set of base style feature representations includes a local feature representation for each of a plurality of layers of the ML model; the total loss is determined at least partially based on a content loss, the content loss being calculated based on differences between a base content feature representation and a stylized feature representation, each corresponding to a layer of the ML model; the total loss is determined at least partially based on a style loss, the style loss being calculated based on differences between base style feature representations in the set of base style feature representations and stylized feature representations in the set of stylized feature representation, each base style feature representations and stylized feature representation used to calculate a difference correspond to a layer of the ML model; denoising at least partially includes executing one of a statistical outlier algorithm and a radius outlier algorithm to identify outliers in the initial stylized object model, and removing outliers from the initial stylized object model to provide the stylized object model; and each of the content object model, the style object model, and the stylized object model is provided as a point cloud model and the ML model comprises PointNet++.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference symbols in the various drawings indicate like elements.

DETAILED DESCRIPTION

Figure 1:
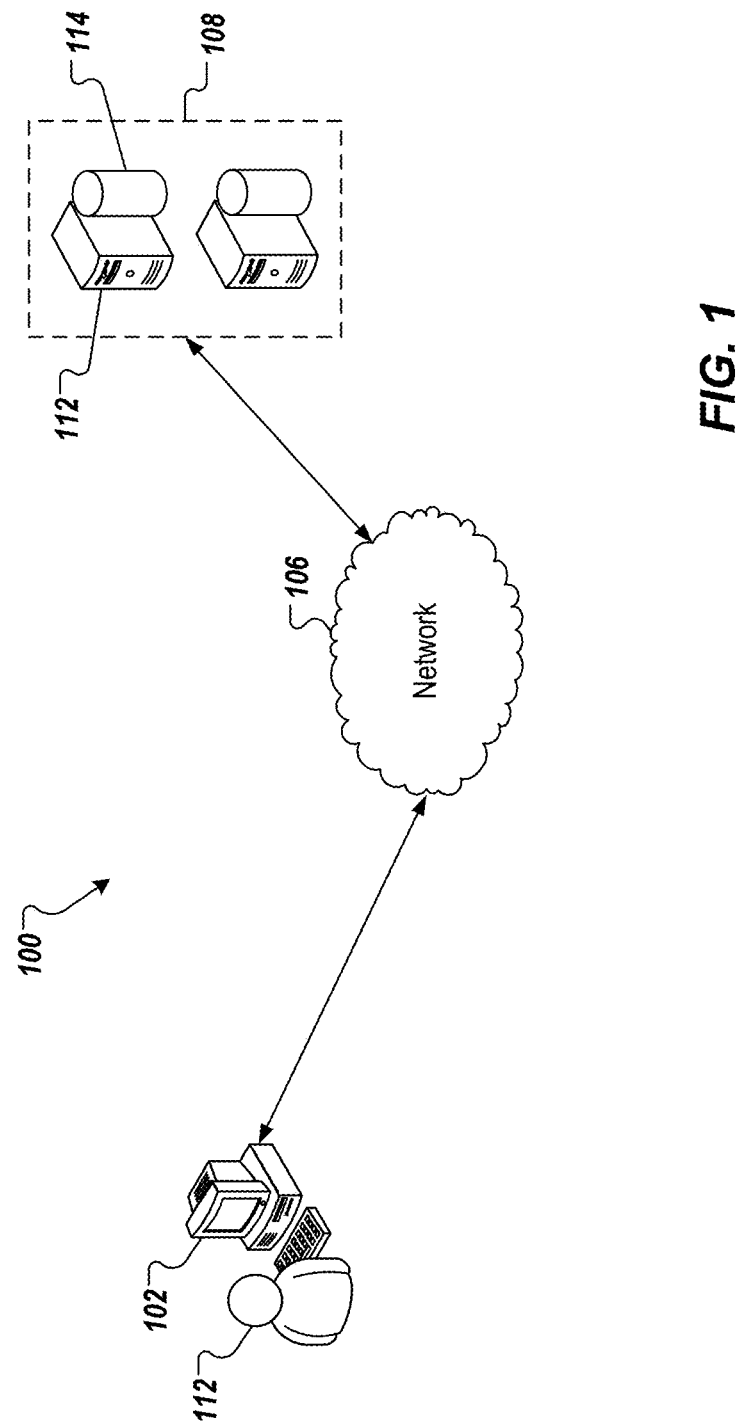
FIG. 1 depicts an example system that can execute implementations of the present disclosure.

Implementations of the present disclosure are generally directed to computer-implemented systems for assisting in product design phases. More particularly, implementations of the present disclosure are directed to a computer-implemented intelligent design platform for assisting in design phases of products. In some implementations, the intelligent design platform of the present disclosure includes multi-dimensional model style transfer that enables a shape of a style object to be at least partially applied to content of a content object in a stylized object. In some examples, the style transfer includes applying at least a portion of a shape of the style object to the content of the content object. In some examples, the style object is represented as a multi-dimensional style object model and the content object is represented as a multi-dimensional content object model. In some examples, at least a portion of the shape of the style object, as represented in the multi-dimensional style object model, is applied to content of the multi-dimensional content object model to provide the multi-dimensional stylized object model.

In some implementations, actions include processing a content object model through a machine learning (ML) model to provide a set of base content feature representations, processing a style object model through the ML model to provide a set of base style feature representations, executing two or more iterations of an iterative process, each of the two or more iterations including: generating, by the ML model, a set of stylized feature representations for an initial stylized object model, the initial stylized object model having one or more adjusted parameters relative to a previous iteration, determining a total loss based on the set of stylized feature representations, the set of base content feature representations, and the sets of base style feature representations, and determining that the total loss is non-optimized, and in response, initiating a next iteration, executing an iteration of the iterative process, the iteration including determining that the total loss is optimized, and in response providing the initial stylized object model as output of the iterative process, and denoising the initial stylized object model to provide a stylized object model representing a stylized object comprising at least a portion of content of the content object model and at least a portion of a shape of the style object model.

To provide context for implementations of the present disclosure, a product lifecycle can include multiple processes. Example processes can include, without limitation, a design process, a testing process, and a production process. Each process can include one or more phases. For example, an example design process can include a requirements phase, a design phase, an evaluation phase, and a prototyping phase. In some examples, the requirements phase includes provision of a high-level outline (e.g., notes, sketches) of the product including requirements (e.g., expected features, functions, and the like). In some examples, the design phase can include producing a product design based on the requirements. For example, modeling tools (e.g., Creo, AutoCAD, Catia, SolidWorks, Onshape) to produce computer-implemented models (e.g., 2D/3D models) of the product. In some examples, the evaluation phase can include evaluating the product model (e.g., FEA, CFD, MBD, structural analysis, thermal analysis, stability analysis) using evaluation tools (e.g., Ansys, Hypermesh, Hyperworks) to identify strengths/weaknesses, and/or whether the product model meets the requirements. In some examples, the prototyping phase includes producing a physical prototype of the product based on the product design. For example, the product model is converted to code for CNC machining, and/or 3D using one or more prototyping tools (e.g., Creo, DellCAM, MasterCAM).

In each instance, the design process is iterative. For example, iterations of designs are provided, each iteration including changes to an earlier design. Inefficiencies are introduced, as the number of iterations increases. That is, for example, at each iteration, designers spend time, and resources (e.g., computing resources) to refine the design. Current design processes lack tools to reduce the number of iterations and increase the efficiency of the design process.

In view of this, implementations of the present disclosure provide a computer-implemented intelligent design platform for assisting in design phases of products. In some implementations, the intelligent design platform of the present disclosure includes multi-dimensional style transfer that enables a shape of a style object to be at least partially applied to a content object. In some examples, the style transfer includes applying at least a portion of a shape of the style object to content of the content object to provide a stylized object. In some examples, the style object is represented as a multi-dimensional style object model (also referred to herein as a style object model), the content object is represented as a multi-dimensional content object model (also referred to herein as a content object model), and the stylized object is represented as a multi-dimensional stylized object model (also referred to herein as a stylized object model). As described herein, the multi-dimensional style transfer is executed using one or more machine-learning (ML) models.

Implementations of the present disclosure are described in further detail herein with non-limiting reference to each of the content object model and the style object model being represented as a multi-dimensional point cloud model. In general, a point cloud model can be described as a multi-dimensional point representation of an object that includes a set of n points defined by a coordinate system. In some examples, each point is represented by coordinates (e.g., [x, y, z]). In some examples, additional dimensions can be added to the representation of each point by, for example, determining normals, local features (e.g., color channels (RGB)), and/or global features. While mesh models are discussed herein, it is contemplated that implementations of the present disclosure can be realized using any appropriate type of model. For example, implementations of the present disclosure can be realized with each of the content object model and the style object model being represented as a mesh model. In general, a mesh model can be described as a multi-dimensional mesh representation of an object that includes a mesh of interconnected polygons (e.g., triangles), each shape representing a face of the object.

In some implementations, and as introduced above, multi-dimensional style transfer of the present disclosure includes applying at least a portion of a shape of the style object to the content of the content object to provide a stylized object. In some examples, prior to executing style transfer, a stylized object model is initialized as the content object model. That is, for example, the stylized object model is initially identical to the content object model. In some implementations, the style transfer is executed as an iterative process, where, at each iteration, a set of stylized feature representations (of the stylized object, to which the shape is being transferred) is generated, and a total loss is determined based on a set of base content feature representations, a set of base style feature representations, and the set of stylized feature representations. In some examples, and as described in further detail herein, each of the set of base content feature representations, the set of base style feature representations, and the set of stylized feature representations is generated by processing the content object, the style object and the stylized object, respectively, through one or more ML models. In some examples, and as described in further detail herein, each of the set of base content feature representations, the set of base style feature representations, and the set of stylized feature representations can be provided as local feature representations (e.g., local feature vectors) from one or more layers of an ML model.

In some implementations, for each iteration, it is determined whether the total loss is optimized (e.g., meets a threshold total loss). If the total loss is not determined to be optimized, a next iteration is executed, in which one or more parameters of the stylized object model are updated. In some examples, in the next iteration, the set of stylized feature representations is generated using the one or more ML models. If the total loss is determined to be optimized, the iterative process ends, and the stylized object provided as input to the last iteration is provided as output of the iterative process. In some examples, denoising is executed to remove noise (e.g., outlier points) from the stylized object, as described in further detail herein.

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host one or more applications that are provided as part of an intelligent design platform in accordance with implementations of the present disclosure.

In some examples, the back-end system 108 hosts an intelligent design platform that provides multi-dimensional style transfer in accordance with implementations of the present disclosure. For example, a user 120 (e.g., a designer) can interact with the intelligent design platform using the computing device 102. In some examples, the user 120 can provide a content object model and a style object model, which can be processed to provide a stylized object model by applying at least a portion of a shape of the style object model to the content object model, as described in further detail herein.

Figure 2:
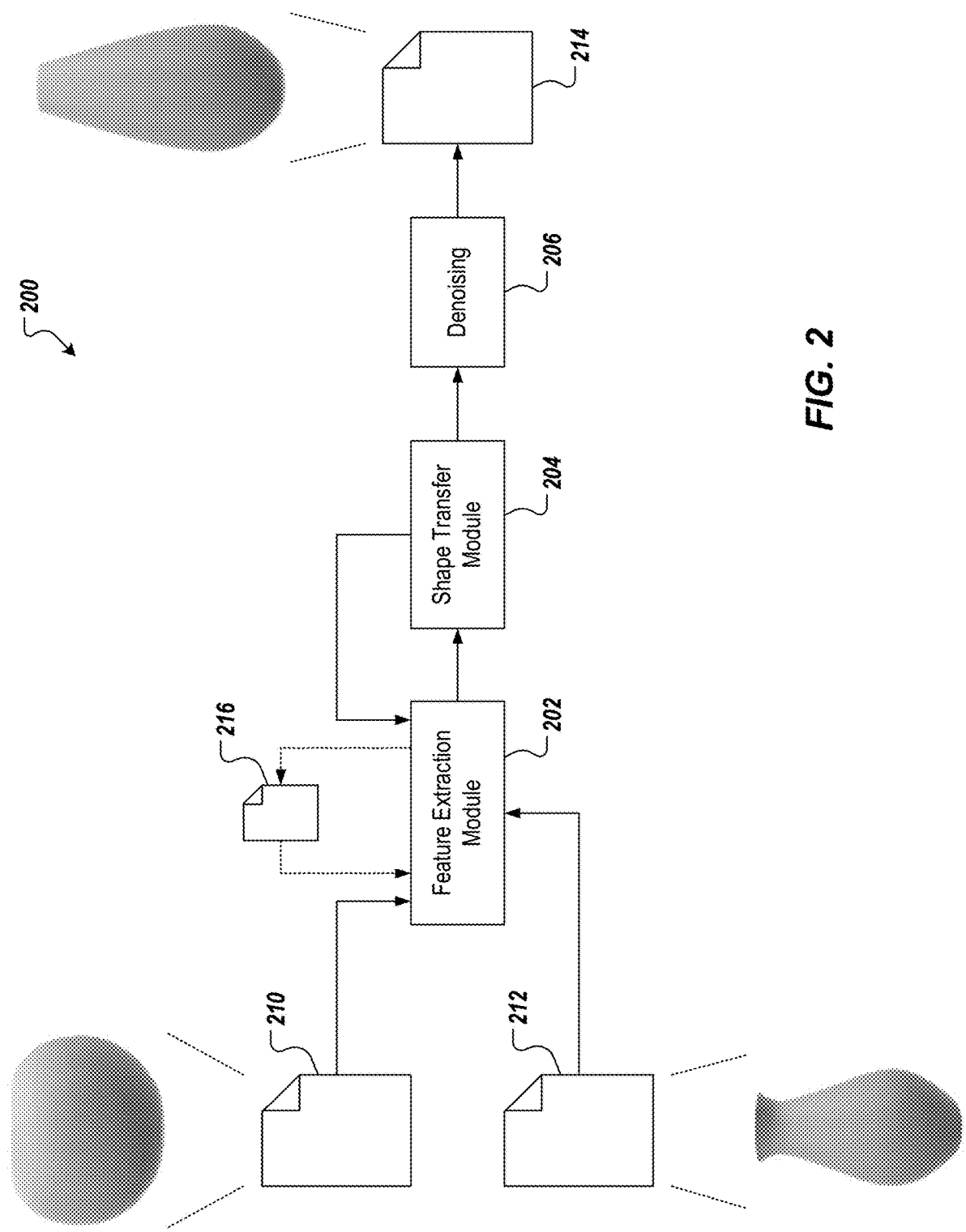
FIG. 2 depicts a conceptual architecture for multi-dimensional style transfer in accordance with implementations of the present disclosure.

FIG. 2 depicts an example conceptual architecture 200 for multi-dimensional style transfer in accordance with implementations of the present disclosure. The example conceptual architecture 200 can be part of an intelligent design platform and represents multi-dimensional style transfer through application of at least a portion of a shape of a style object model to a content object model. Here, the content object model represents content as a target, to which a shape of the style object model is to be applied. That is, the style object model is the source of the shape and the content object model provides the content, to which the shape (or at least a portion of the shape) is applied.

The example conceptual architecture 200 of FIG. 2 includes a feature extraction module 202, a shape transfer module 204, and a denoising module 206. As described in further detail herein, a content object model 210 and a style object model 212 are provided as input and a stylized object model 214 is provided as output. In some examples, the content object model 210, the style object model 212, and the stylized object model 214 are each digitally represented within a respective computer-readable file, which can be processed through the conceptual architecture 200.

In some examples, the content object model 210, the style object model 212, and the stylized object model 214 are each provided as point cloud models, described in further detail herein by way of example. As introduced above, a point cloud model can be described as a multi-dimensional point representation of an object that includes a set of N points (e.g., N=1024) defined by a coordinate system. In some examples, each point is represented by coordinates (e.g., [x, y, z]). In some examples, additional dimensions can be added to the representation of each point by, for example, determining normals, local features (e.g., color channels (RGB)), and/or global features. Again, and as noted above, implementations of the present disclosure can be realized with each of the content object model, the style object model, and the stylized object model being represented as any appropriate type of model, such as a multi-dimensional mesh model, for example.

In some implementations, prior to executing the iterative process (iterative shape transfer process), the content object model 210 and the style object model 212 are each processed through one or more ML models by the feature extraction module 202 to respectively provide a set of base content feature representations and sets of base style feature representations. In some examples, each of the set of base content feature representations and the sets of base style feature representations are processed by the shape transfer module 204 as baseline feature representations to determine the total loss at each iteration of the iterative process (e.g., comparing output feature representations to the base feature representations).

In further detail, and in the example context of point clouds, to provide each of the set of base content feature representations and the sets of base style feature representations, the content object model 210 and the style object model 212 are each processed through a ML model. An example ML model includes PointNet++, which is described in detail in *PointNet++: Deep Hierarchical Feature Learning on Point Sets in a Metric Space*, Qi et al., Jun. 7, 2017 ("Qi-1"), which is expressly incorporated herein by reference in the entirety. PointNet++ can be described as an improvement over PointNet, which is described in detail in *PointNet: Deep Learning on Point Sets for 3D Classification and Segmentation*, Qi et al., Apr. 10, 2017 ("Qi-2"), which is expressly incorporated herein by reference in the entirety.

Figure 3A:
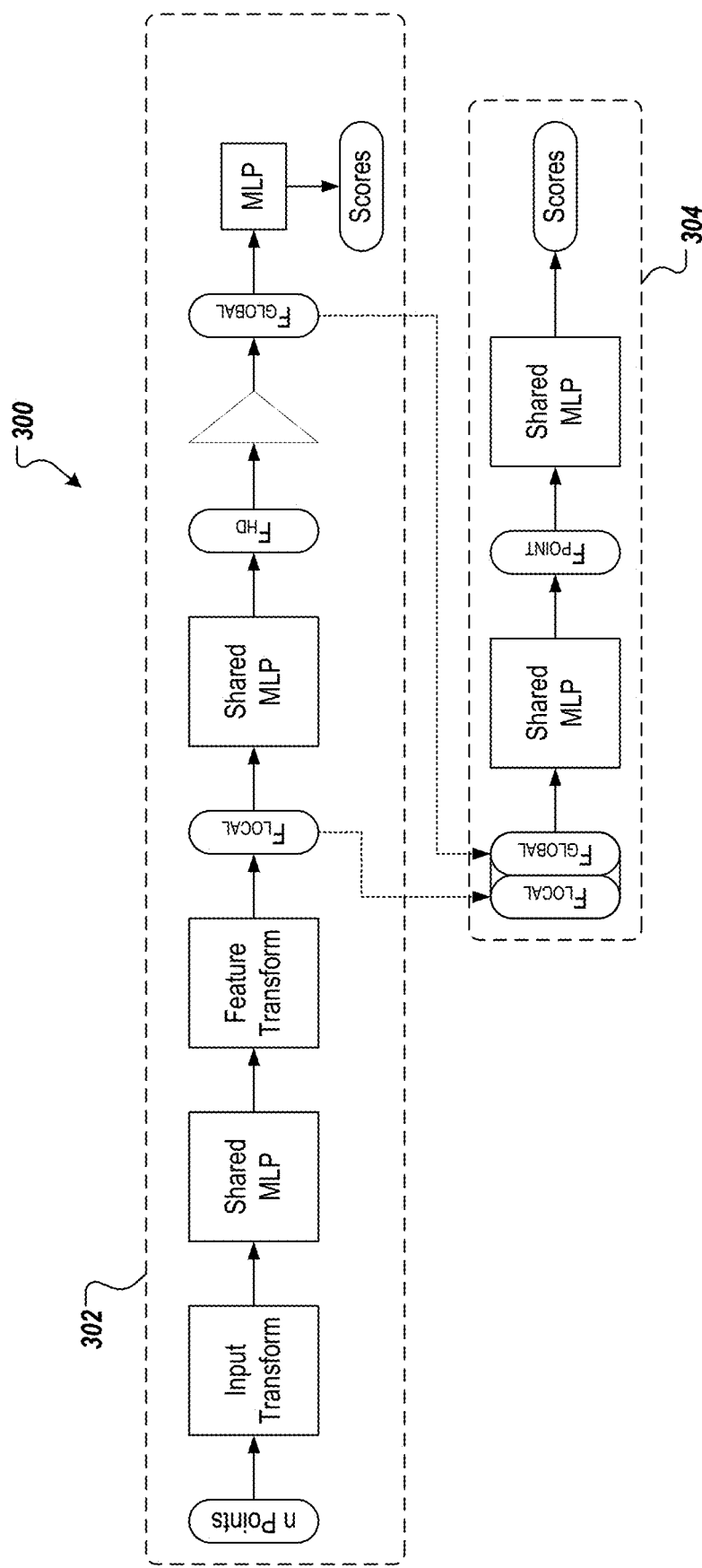
FIG. 3A depicts an example architecture of a machine learning (ML) model.

FIG. 3A depicts an architecture 300 of PointNet. In general, PointNet includes a classification network 302 and a segmentation network 304. Qi-2 describes that the classification network 302 takes N points as input, applies input and feature transformations, and aggregates point features by max pooling, and the output is classification scores for k classes. For example, a classification score can be output by the classification network 302 and can indicate that an object represented in an object model belongs to a class 'chair' among other potential classes having lower classification scores. Qi-2 also describes that segmentation is treated as a per-point classification problem (e.g., classifying each point as belonging to a particular segment). To this end, the segmentation network 304 is described as an extension to the classification network 302, and that the segmentation network 304 concatenates global features (represented in a global feature vector ($F_{GLOBAL}$)) and local features (represented in a local feature vector ($F_{LOCAL}$)) and outputs per point scores, which represent a segmentation label (class) indicating a segment that each point belongs to.

Qi-1 notes that, by design, PointNet does not capture local structure and that exploiting local structure can be important for convolutional architectures to be successful in their tasks (e.g., classification). In view of this, Qi-1 introduces PointNet++ and describes PointNet++ as a hierarchical neural network that processes a set of points in a hierarchical fashion. In general, Qi-1 discusses that PointNet++ builds a hierarchical grouping of points and progressively abstracts larger and larger local regions along the hierarchy. In contrast, PointNet uses a single max pooling operation to aggregate the entire point set. In some implementations, PointNet++ is trained using the ModelNet40 dataset, which includes a collection of 12,311 object models in 40 categories. In some examples, 9,843 of the object models are used as the training dataset and 2,468 of the object models are used as the test dataset. In some examples, each object model (provided as a point cloud) is randomly sampled to 1024 points (i.e., N=1024), each point including respective coordinates and normal (i.e., [x, y, z, $n_x$, $n_y$, $n_z$]). That is, while the object models of ModelNet40 can each have a significantly greater number of points, the points are randomly down-sampled to 1024 points.

Figure 3B:
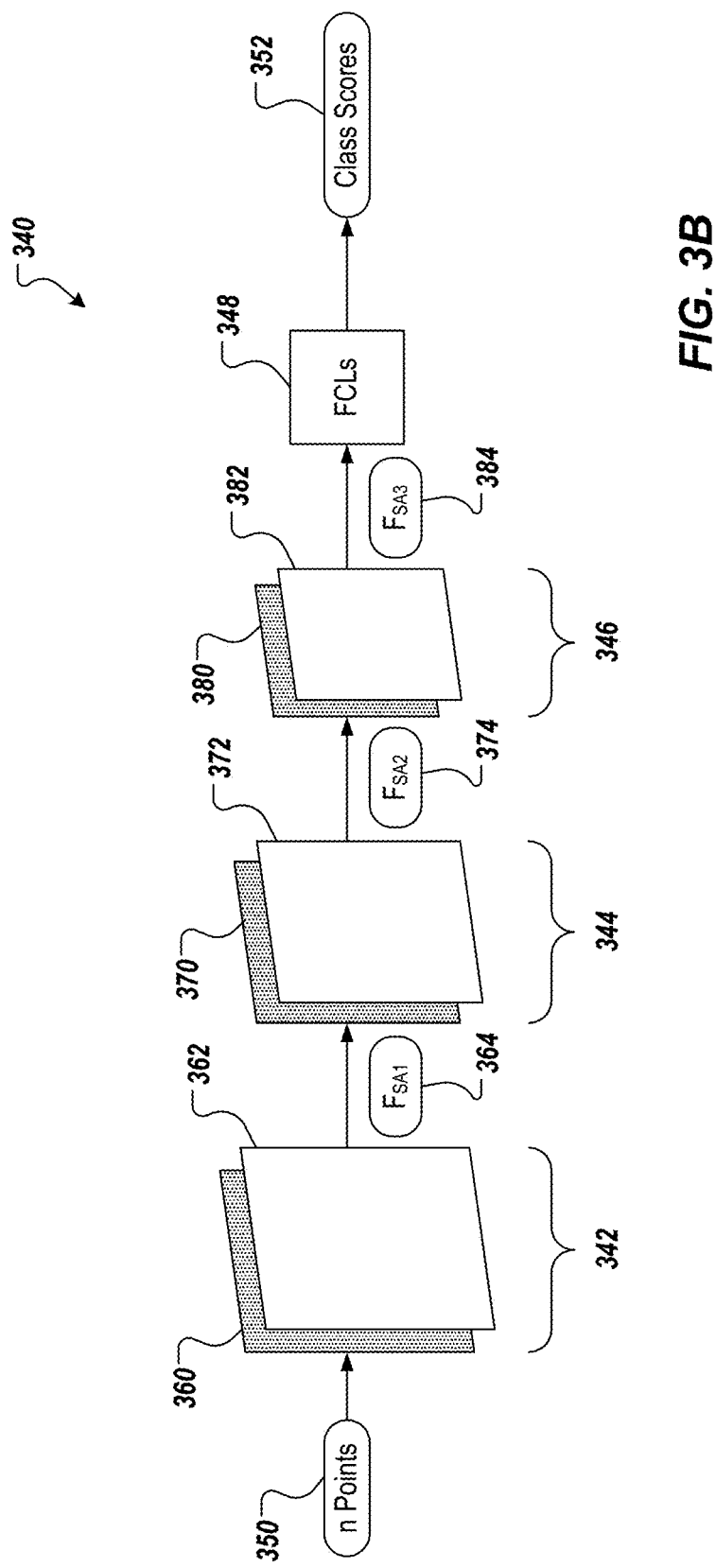
FIG. 3B depicts an example architecture of a machine learning (ML) model.

FIG. 3B depicts a conceptual representation 340 of PointNet++. The conceptual representation 340 includes hierarchical structure as a series of set abstractions including a first set abstraction (SA1) 342, a second set abstraction (SA2) 344, and a third set abstraction (SA3) 346, and one or more fully connected layers (FCLs) 348. As a classifier, PointNet++ receives a set of N points 350 and provides a set of class scores 352 as output. In some examples, the set of class scores include one or more scores, each score representing a likelihood that an object represented in the point cloud model (e.g., defined as the set of n points) belongs to a respective class (e.g., chair, desk).

Each set abstraction (hierarchical level) is made of a sampling and grouping layer (SGL) and a PointNet layer (PL). In the example of FIG. 3B, the SA1 342 includes a SGL 360 and a PL 362, and outputs a feature vector ($F_{SA1}$) 364, the SA2 344 includes a SGL 370 and a PL 372, and outputs a feature vector ($F_{SA2}$) 374, and the SA3 346 includes a SGL 380 and a PL 382, and outputs a feature vector ($F_{SA3}$) 384.

In operation, at each hierarchical level (set abstraction), a set of points is processed and abstracted to produce a new set with fewer elements. In each set abstraction, the sampling layer selects a sub-set of points from a set of points input to the set abstraction, the sub-set of points defining centroids of local regions. In each set abstraction, the grouping layer constructs local region sets by finding "neighboring" points around each centroid in the sub-set of points of the sampling layer. In each set abstraction, the PL uses a so-called mini-PointNet to encode local region patterns into feature vectors.

In further detail, the set abstractions 342, 344, 346 implement a hierarchical learning of features of the object represented in the object model (e.g., as the set of N points 350). The SA1 342 samples $N_1$ points from the point cloud of size N (i.e., as the set of N points 350, where $N_1 \subset N$). The $N_1$ points are used to compute features that pertain to this local region, which are output as $F_{SA1}$ 364. The SA2 344 samples $N_2$ points from the $N_1$ points (i.e., $N_2 \subset N_1$) and the nearest neighbors are determined. The $N_2$ points are used to compute features that pertain to this local region, which are output as $F_{SA2}$ 374. Accordingly, there is a shift in scale between layers in that features learned at a previous layer are propagated to incorporate a larger receptive field. The SA3 346 accumulates features from the SA1 342 and the SA2 344 to generate $F_{SA3}$. In some examples, $F_{SA3}$ is provided as a 1024×1 feature vector that represents a signature of the object model (point cloud).

In accordance with implementations of the present disclosure, the set of base content feature representations and the set of base style feature representations are each provided as a set of intermediate representations determined in respective layers of the ML model during processing of the content object model and the style object model, respectively, prior to execution of the iterative process. That is, and as explained in further detail herein, the set of base content feature representations includes a local feature representation output by a layer of the ML model for the content object, and the set of base style feature representations includes local feature representations from respective layers of the ML model for the style object.

In some examples, for the content object, the set of base content feature representations includes $F_{SA2}$ output by the SA2 344. That is, as the content object model is processed through PointNet++, $F_{SA2}$ output by the SA2 344 is recorded as the set of base content feature representations. Accordingly, the set of base content feature representations ($F_{t,b}$) can be provided as:

$$F_{t,b} = F_{SA2,t}$$

where t indicates target (reference to the content object) and b indicates base. In some examples, the set of base content feature representations ($F_{t,b}$) can include $F_{SA1}$ output by the SA1 342. For example:

$$F_{t,b} = F_{SA1,t}$$

In some examples, for the style object, the set of base style feature representations includes $F_{SA1}$ output by the SA1 342, $F_{SA2}$ output by the SA2 344, and $F_{SA3}$ output by the SA3 344. That is, as the style object model is processed through PointNet++, $F_{SA1}$ output by the SA1 342, $F_{SA2}$ output by the SA2 344, and $F_{SA3}$ output by the SA3 344 are recorded as the set of base style feature representations. Accordingly, the set of base style feature representations ($F_{s,b}$) can be provided as:

$$F_{s,b} = [F_{SA1,s}, F_{SA2,s}, F_{SA3,s}]$$

where s indicates source (reference to the style object) and b indicates base.

The set of base content feature representation ($F_{t,b}$) and the set of base style feature representations ($F_{s,b}$) are stored in computer-readable memory for use in calculating total loss in iterations of the iterative process, as described in further detail herein. After the set of base content feature representations ($F_{t,b}$) and the set of base style feature representations ($F_{s,b}$) are determined and stored, the iterative process can be executed to determine the stylized object that is ultimately represented in the stylized object model 214. In some examples, the iterative process includes a set of iterations (I), where I=1, . . . , p, and p is the last iteration performed in response to determining that, at iteration p, the total loss is optimized, as described in further detail herein.

In some implementations, at a first iteration (i=1), a stylized object model 216 is initialized as the content object model 210. That is, prior to execution of the first iteration, the content object model 210 and the stylized object model 216 are identical. This is because, at the first iteration, none of the shape of the style object model 212 has been transferred to the content object model 210 to provide the stylized object model 216.

In each iteration of the iterative process, the feature extraction module 202 processes the stylized object model 216 to provide a set of stylized feature representations. More particularly, the feature extraction module 202 processes the stylized object model 216 through the ML model to provide the set of stylized feature representations. In some examples, the ML model is the same ML model that is used to provide the base feature representations (e.g., PointNet++). In some examples, after each of one or more iterations, parameters of the stylized object model 216 are changed. In this manner, stylized feature representations generated by the ML model are different from one iteration to the next.

In further detail, for each iteration i in the set of iterations (I), a set of stylized feature representations is provided. In some examples, the set of stylized feature representations includes $F_{SA1}$ output by the SA1 342, $F_{SA2}$ output by the SA2 344, and $F_{SA3}$ output by the SA3 344. That is, as the stylized object model is processed through PointNet++, $F_{SA1}$ output by the SA1 342, $F_{SA2}$ output by the SA2 344, and $F_{SA3}$ output by the SA3 344 are recorded as the set of stylized feature representations for the current iteration (i). Accordingly, the set of stylized feature representations ($F_{S,i}$) can be provided as:

$$F_{S,i} = [F_{SA1,i}, F_{SA2,i}, F_{SA3,i}]$$

where S indicates stylized (reference to the stylized object) and i indicates the iteration the feature representations are determined during. The set of stylized feature representations ($F_{S,i}$) is stored in computer-readable memory for use in calculating total loss in the iteration i, as described in further detail herein.

In some implementations, for each iteration i, the set of stylized feature representations is provided to the shape transfer module 204. The shape transfer module 204 processes the set of base content feature representations, the set of base style feature representations, and the set of stylized feature representations to determine a total loss. In some implementations, and as described in further detail herein, the total loss is iteratively optimized, a set of stylized feature representations being provided at each iteration. In some examples, if an iteration achieves an optimized total loss, the stylized object model 216 provided as input of that iteration (e.g., iteration p) is provided as output to the denoising module 206, and the iterations end.

In further detail, at each iteration, the shape transfer module 204 receives the set of stylized feature representations. In some implementations, the shape transfer module 204 determines a content loss and a style loss, and determines a total loss based on the content loss and the style loss.

In some implementations, the content loss for an iteration ($L_{C,i}$) is determined based on the base content feature representation $F_{SA2,t}$ in the set of base content feature representations and the stylized feature representation $F_{SA2,i}$ in the set of stylized feature representations. In this manner, feature representations output from the SA2 344 of the ML model are used to determine the content loss. In some examples, the content loss represents a degree, to which a content of the stylized object, as represented in the set of stylized feature representations, differs from a content of the content object, as represented in the set of base content feature representations.

In some examples, the content loss is calculated as a root mean square (RMS) difference between the base feature representation ($F_{SA2,t}$) and the stylized feature representation $F_{SA2,i}$. In some examples, the following example relationship can be considered:

$$L_{C,i} = \frac{\sum_{q=1}^{n}(f_{SA2,i} - f_{SA2,t})^2}{n}$$

where $f_{SA2,i}$ is a stylized feature representation of the $q^{th}$ point of the content object model 210 as processed through the ML model for the iteration i, and $f_{SA2,t}$ is a base content feature representation of the $q^{th}$ point of the content object model 210 as initially processed through the ML before the iteration i, and n is the number of points in the content object model 210. In other words, n is the length of the feature representations (e.g., a feature vector of n-dimensions).

In some implementations, the style loss for an iteration ($L_{S,i}$) is determined based on one or more of the base style feature representations ($F_{SA1,s}$, $F_{SA2,s}$, $F_{SA3,s}$) and one or more of the stylized feature representations ($F_{SA1,i}$, $F_{SA2,i}$, $F_{SA3,i}$). In this manner, feature representations output from one or more of the SA1 342, the SA2 344, and the SA3 346 of the ML model (i.e., local feature representations) are used to determine the style loss. In some examples, the style loss represents a degree, to which a style of the stylized object, as represented in the set of stylized feature representations, differs from a style of the style object, as represented in the set of base style feature representations.

In some examples, the style loss is calculated using the following example relationship:

$$L_{S,i} = \sum_{\omega \in \Omega, f_{so} \in F_{S,i}, f_{sour} \in F_{s,b}} \omega \times D(f_{so}, f_{sour})$$

where $\Omega$ is a set of weights $\omega$ and D is a loss function. In some examples, each weight $\omega$ in the set of weights $\Omega$ corresponds to a respective layer of the ML model. For example $\Omega = \omega_1, \omega_2, \omega_3$, where $\omega_1$ is a first weight corresponding to the SA1 342, $\omega_2$ is a second weight corresponding to the SA2 344, and $\omega_3$ is a third weight corresponding to the SA3 346. In some examples, a respective weight is applied to a result of the loss function for feature representations of the corresponding hierarchical level used in the loss function calculation. For example, when feature representations of $f_{so}$ and $f_{sour}$ corresponding to the SA1 342 (i.e., provided from $F_{SA1,i}$ and $F_{SA1,b}$, respectively), $\omega_1$ is applied, when feature representations of $f_{so}$ and $f_{sour}$ corresponding to the SA2 344 (i.e., provided from $F_{SA2,i}$ and $F_{SA2,b}$, respectively), $\omega_2$ is applied, and when feature representations of $f_{so}$ and $f_{sour}$ corresponding to the SA3 346 (i.e., provided from $F_{SA3,i}$ and $F_{SA3,b}$, respectively), $\omega_3$ is applied.

In some implementations, the loss function D is provided as a chamfer loss, also referred to as chamfer distance, which can be described as the sum of the Euclidean (L2) distances for a feature representation of a point in a first set (e.g., $F_{S,i}$) to a feature representation of a nearest neighbor face in a second set (e.g., $F_{s,b}$). To determine a chamfer distance (D), the following example relationship can be provided:

$$D(F_{S,i}, F_{s,b}) = \sum_{f_{so} \in F_{S,i}} \min_{f_{sour} \in F_{sour,b}} d(f_{so}, f_{sour}) + \sum_{f_{sour} \in F_{s,b}} \min_{f_{so} \in F_{S,i}} d(f_{so}, f_{sour})$$

where d is a distance between feature representation $f_{so}$ and feature representation $f_{sour}$.

In some examples, the style loss is calculated as a Gram loss, which can be described as flattening feature vectors (i.e., the feature vectors being compared) from a convolutional feature map of depth C and computing the dot product. The result is a Gram matrix (of size C×C) for each feature vector. The mean squared error loss between Gram matrices is computed as the style loss. In some examples, respective weights $\omega_1$, $\omega_2$, $\omega_3$ can be applied depending on which layer of PointNet++ the respective feature vectors are provided from, as similarly described above.

In some implementations, at each iteration, the shape transfer module 204 determines the total loss ($L_{T,i}$). In some examples, the total loss is calculated based on the following example relationship:

$$L_{T,i} = \alpha L_{C,i} + \beta L_{S,i}$$

where $\alpha$ is a content weight and $\beta$ is a style weight (e.g., $\beta \geq 0$, $\beta \geq 0$).

In some implementations, the total loss is optimized over the iterations using an optimizer. Example optimizers include, without limitation, a stochastic gradient descent (SGD) optimizer, and the Adam optimizer algorithm. In some examples, the total loss is optimized to achieve an expected value (e.g., 0), or to be within a defined degree of the expected value (e.g., ±1%).

In some implementations, optimization of the total loss includes adjusting parameters of the stylized object model 216 at each iteration. For example, and without limitation, point information can be adjusted for one or more points of the stylized object model 216 (e.g., in the case of a point cloud model). In some examples, coordinates [x, y, z] of one or more points can be changed. For example, for an iteration, coordinates of a point can be provided as $[x_1, y_1, z_1]$, and, for a next iteration coordinates of the point can be provided as $[x_2, y_2, z_2]$. In some examples, between iterations, a delta value can be used for changes to respective point information, the delta value pushing toward optimization of the total loss. In some examples, the delta value can change across iterations. For example, for an iteration, the delta value can be provided as a first value and, for a next iteration, the delta value can be provided as a second value, the second value being less than the first value. In this manner, changes to the stylized object model 216 can be more coarse-grained between earlier iterations and more fine-grained between later iterations.

Accordingly, through the iterative process, the stylized object model 216 iteratively changes from being identical to the content object model 210 (i.e., the stylized object model 216 is initialized as the content object model 210) to being a stylized version of the content object model 210 including at least a portion of a style (shape) of the style object model 212.

In accordance with implementations of the present disclosure, the denoising module 206 receives the stylized object model 216 of the last iteration. In further detail, in the iterative process resulting in output of the iteratively changed stylized object model 216, points of the point cloud model move, which results in at least some points being unacceptably distant (outliers) in the subsequently generated stylized object. In view of this, denoising is performed to provide the stylized object, represented in the stylized object model 214. In this sense, the stylized object model 216 output by the iterative process can be considered an initial stylized object model 216 that is processed through denoising to provide the stylized object model 214.

In further detail, example denoising can include, without limitation, denoising using a statistical outlier approach and denoising using a radius outlier approach. In the statistical outlier approach, points of the stylized object model are iterated through twice. In a first iteration, an average distance that each point has to its nearest k neighbors is determined, the mean and standard deviation of each of the distances are computed, and a distance threshold is determined. In a second iteration, each point of the stylized object model is classified as an outlier, if the point's average neighbor distance exceeds the distance threshold, or is classified as an inlier, if the point's average neighbor distance does not exceed the distance threshold. Points that are classified as outliers can be removed from the stylized object model. In the radius outlier approach, a point can be selectively filtered (removed) from the stylized object model based on a number of neighbors that the point has. For example, in a first iteration, a number of neighbors within a defined radius of each point is determined. In some examples, a neighbor threshold is determined based on the numbers of neighbors of the points. In a second iteration, each point of the stylized object model is classified as an outlier, if the point's number of neighbors does not exceed the neighbor threshold, or is classified as an inlier, if the point's number of neighbors exceeds the neighbor threshold. Points that are classified as outliers can be removed from the stylized object model.

Figure 4B:
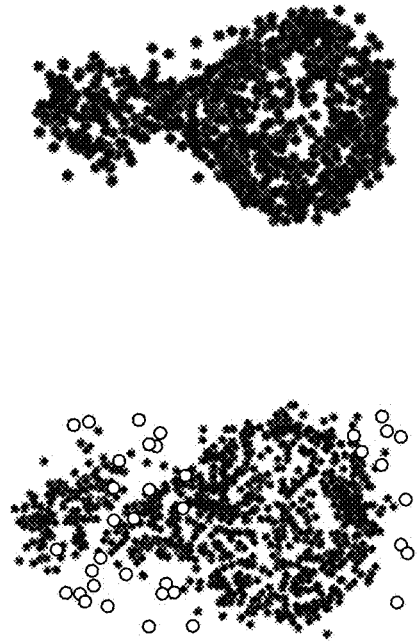
FIGS. 4A and 4B depict representations of denoising in accordance with implementations of the present disclosure.
Figure 4A:
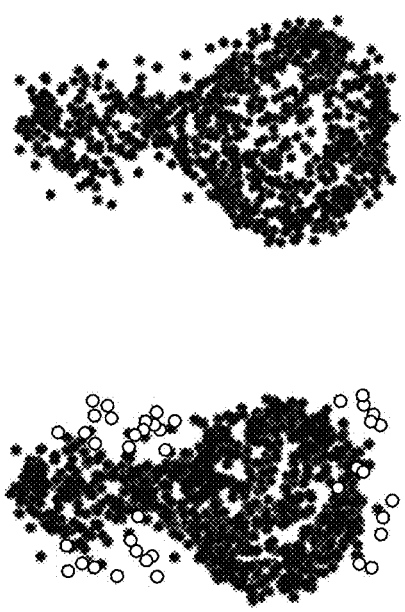

FIGS. 4A and 4B depict representations of denoising using the statistical outlier approach and the radius outlier approach, respectively. In the examples of FIGS. 4A and 4B, white points have been classified as outliers and are removed from the stylized object models depicted therein.

Figure 5B:
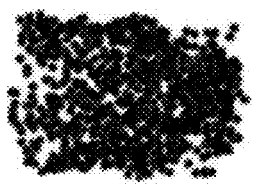
FIGS. 5A-5C depict examples of style transfer in accordance with implementations of the present disclosure.
Figure 5B:
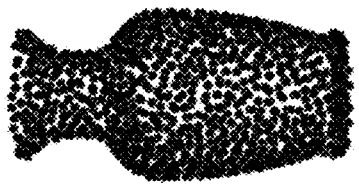
Figure 5B:
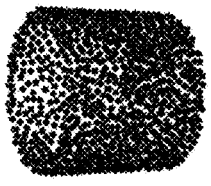
Figure 5A:
Figure 5A:
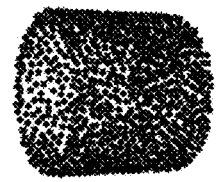
Figure 5A:
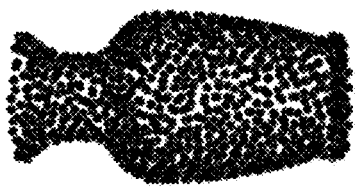
Figure 5C:
Figure 5C:
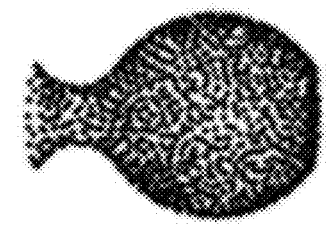
Figure 5C:
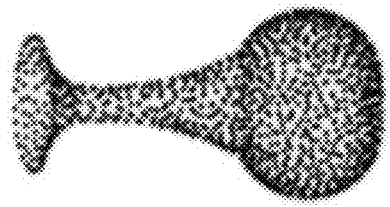

FIGS. 5A-5C depict examples of style transfer in accordance with implementations of the present disclosure. The examples of FIGS. 5A-5C were generated using an experimental setup. A non-limiting example experimental setup for training the PointNet++ model is provided as follows:

Number of Points (N): 1024
Normals: True
Optimizer: Adam
Decay Rate: 1e-4
Learning Rate: 0.001
Batch Size: 24
Learning Rate: 0.01
Epochs: 200

A non-limiting example experimental setup for executing shape transfer using the (trained) PointNet++ model is provided as follows:

Content Layers: SA1 (or SA2)
Style Layers: SA1, SA2, SA3
Content Loss: Mean Squared
Style Loss: Gram Loss
Content Weight ($\alpha$): $1$-$10^2$
Style Weight ($\beta$): $1$-$10^9$
Learning Rate: 0.01
Optimizer: Adam
Epochs: 100

In the above example experimental set-up, different values for content weight ($\alpha$) (e.g., values within the range of 1 to 100) and different values for style weight ($\beta$) (e.g., values within the range of 1 to $10^9$) were used. It should be noted that, while example values are provided above, any appropriate values can be used. In some examples, epochs need not be limited to a specified number of epochs (e.g., limiting iterations to the number of epochs) and can be open ended (e.g., executing iterations until total loss is determined to be optimized).

In the example of FIG. 5A, the geometric dimensions of the stylized object are similar to the content object (e.g., height, diameter), while the curves of the content object have straightened to be similar to the style object. In the example of FIG. 5B (in which the content object and the style object of FIG. 5A have been reversed), the height of the stylized object is between the content object and the style, while the curves are more similar to the style object. In the example of FIG. 5C, the length of the neck and the curvature of the stylized object is between those of the content object and the style object.

Figure 6:
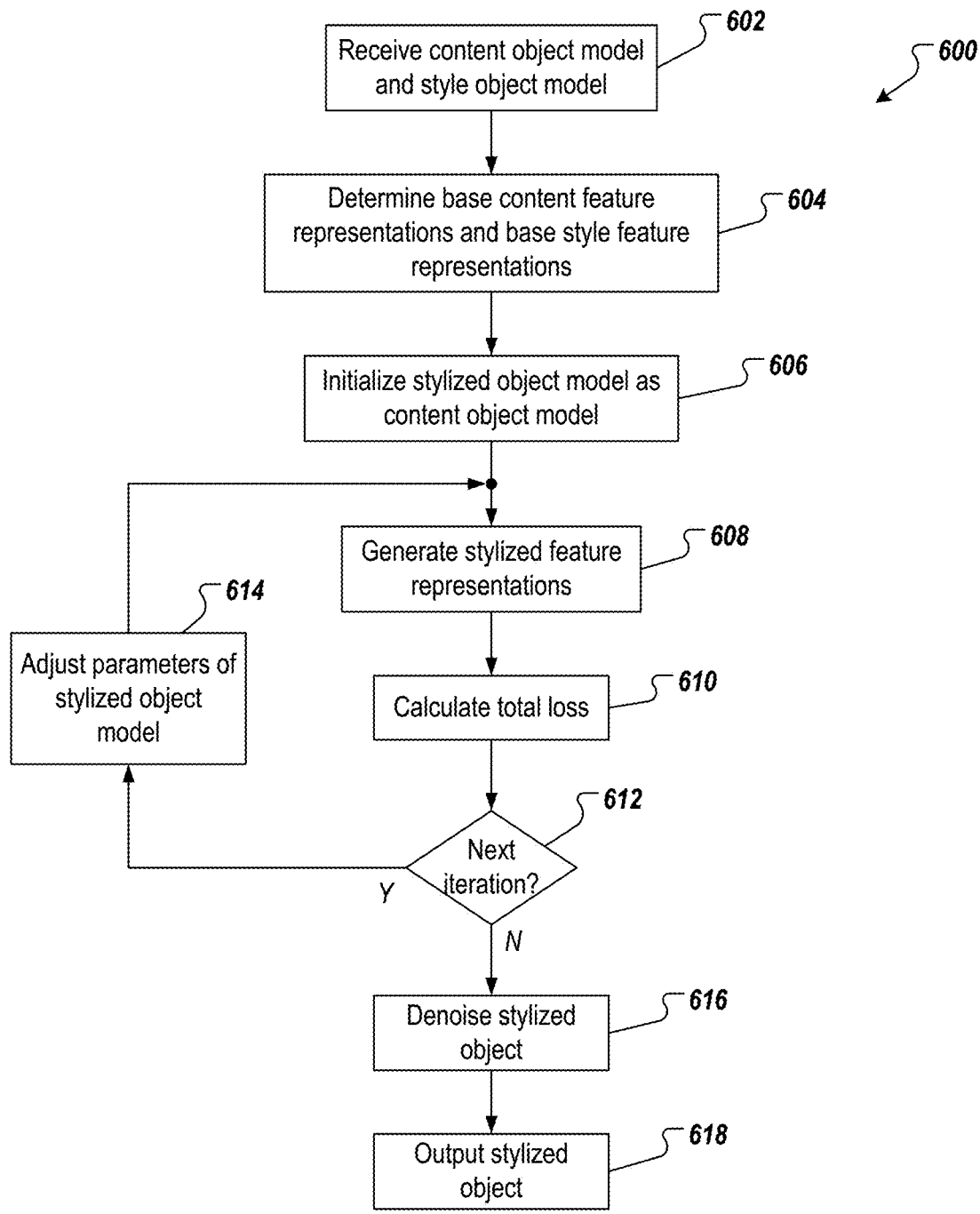
FIG. 6 depicts an example process that can be executed in accordance with implementations of the present disclosure.

FIG. 6 depicts an example process 600 that can be executed in accordance with implementations of the present disclosure. In some implementations, the example process 600 may be performed using one or more computer-executable programs executed using one or more computing devices.

A content object model (target) and a style object model (source) are received (602). For example, and as described herein, the intelligent design platform of the present disclosure receives a content object model 210 and a style object model 212, each as a respective computer-readable file. A set of base content feature representations and a set of base style feature representations are generated (604). For example, and as described herein, the content object model 210 is processed through a ML model (e.g., MeshNet trained on ShapeNet dataset) to provide the set of base content feature representations ($F_{t,b}$) and the style object model 212 is processed through the ML model to provide the set of base style feature representations ($F_{s,b}$).

A stylized object model is initialized as the content object model (606) and the iterative process to generate a stylized object begins. Sets of stylized feature representations are generated (608). For example, and as described herein, for a current iteration i, the stylized object model is processed through the ML model to provide the set of stylized feature representations ($F_{S,i}$). A total loss is calculated (610). For example, and as described in detail herein, the shape transfer module 204 determines the total loss based on the set of base content representations, the sets of base style feature representations, and the sets of stylized feature representations. It is determined whether a next iteration is to be performed (612). For example, and as described herein, the total loss can be compared to an expected value and, if the total loss is not equal to or within a defined range of the expected value (e.g., total loss is not optimized), it can be determined that a next iteration is to be performed. In other words, for the current iteration i, it can be determined whether the total loss has been optimized. If a next iteration is to be performed, one or more parameters of the stylized object model are adjusted (614), and the example process 600 loops back. For example, and as described herein, one or more parameters of the stylized object model are adjusted to iteratively morph the style (shape) of the stylized object model between iterations.

If a next iteration is not to be performed, a stylized object is smoothed (616). For example, and as described herein, the denoising module 206 process the content object model 210 and the stylized object model 216 to provide the stylized object model 214. In some examples, the denoising module 206 uses an averaging algorithm for surface reconstruction to provide the stylized object model 214. The stylized object model is output (518). For example, and as described herein, the denoising module 206 outputs the stylized object model 214 as a computer-readable file.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the to be filed claims.

What is claimed is:

1. A computer-implemented method for multi-dimensional shape transfer between digital models, the method comprising:
    processing a content object model through a ML model to provide a set of base content feature representations output from a second set abstraction of the ML model, the content object model representative of a content object;
    processing a style object model through the ML model to provide a set of base style feature representations comprising a first style feature representation output from a first set abstraction of the ML model, a second style feature representation output from the second set abstraction of the ML model, and a third style feature representation output from a third set abstraction of the ML model, the style object model representing a style object having a texture that is to be applied to the content object;

initializing an initial stylized object model as the content object model, the initial stylized object model representing a stylized object and being absent the texture of the style object;

executing two or more iterations of an iterative process, each of the two or more iterations comprising:
generating, by the ML model, a set of stylized feature representations for an initial stylized object model, the initial stylized object model having one or more adjusted parameters relative to a previous iteration,
determining a total loss based on the set of stylized feature representations of the initial stylized object model, the set of base content feature representations of the content object model, and the sets of base style feature representations of the style object model, and
determining that the total loss is non-optimized, and in response, initiating a next iteration;

executing an iteration of the iterative process, the iteration comprising determining that the total loss is optimized, and in response providing the initial stylized object model as output of the iterative process; and denoising the initial stylized object model to provide a stylized object model representing a stylized object comprising at least a portion of content of the content object model and at least a portion of a shape of the style object model.

2. The method of claim 1, wherein the set of base content feature representations comprises local feature representations.

3. The method of claim 1, wherein the set of stylized feature representations comprises a local feature representation.

4. The method of claim 1, wherein the set of base style feature representations comprise a local feature representation.

5. The method of claim 1, wherein the total loss is determined at least partially based on a content loss, the content loss being calculated based on differences between a base content feature representation and a stylized feature representation, each corresponding to a layer of the ML model.

6. The method of claim 1, wherein the total loss is determined at least partially based on a style loss, the style loss being calculated based on differences between base style feature representations in the set of base style feature representations and stylized feature representations in the set of stylized feature representation, each base style feature representations and stylized feature representation used to calculate a difference correspond to a layer of the ML model.

7. The method of claim 1, wherein denoising at least partially comprises:
executing one of a statistical outlier algorithm and a radius outlier algorithm to identify outliers in the initial stylized object model; and
removing outliers from the initial stylized object model to provide the stylized object model.

8. The method of claim 1, wherein each of the content object model, the style object model, and the stylized object model is provided as a point cloud model and the ML model comprises PointNet++.

9. One or more non-transitory computer-readable storage media coupled to one or more processors and having instructions stored thereon which, when executed by the one or more processors, cause the one or more processors to perform operations for multi-dimensional shape transfer between digital models, the operations comprising:
processing a content object model through a ML model to provide a set of base content feature representations output from a second set abstraction of the ML model, the content object model representative of a content object;

processing a style object model through the ML model to provide a set of base style feature representations comprising a first style feature representation output from a first set abstraction of the ML model, a second style feature representation output from the second set abstraction of the ML model, and a third style feature representation output from a third set abstraction of the ML model, the style object model representing a style object having a texture that is to be applied to the content object;

initializing an initial stylized object model as the content object model, the initial stylized object model representing a stylized object and being absent the texture of the style object;

executing two or more iterations of an iterative process, each of the two or more iterations comprising:
generating, by the ML model, a set of stylized feature representations for an initial stylized object model, the initial stylized object model having one or more adjusted parameters relative to a previous iteration,
determining a total loss based on the set of stylized feature representations of the initial stylized object model, the set of base content feature representations of the content object model, and the sets of base style feature representations of the style object model, and
determining that the total loss is non-optimized, and in response, initiating a next iteration;

executing an iteration of the iterative process, the iteration comprising determining that the total loss is optimized, and in response providing the initial stylized object model as output of the iterative process; and denoising the initial stylized object model to provide a stylized object model representing a stylized object comprising at least a portion of content of the content object model and at least a portion of a shape of the style object model.

10. The non-transitory computer-readable storage media of claim 9, wherein the set of base content feature representations comprises local feature representations.

11. The non-transitory computer-readable storage media of claim 9, wherein the set of stylized feature representations comprises a local feature representation.

12. The non-transitory computer-readable storage media of claim 9, wherein the set of base style feature representations comprise a local feature representation.

13. The non-transitory computer-readable storage media of claim 9, wherein the total loss is determined at least partially based on a content loss, the content loss being calculated based on differences between a base content feature representation and a stylized feature representation, each corresponding to a layer of the ML model.

14. The non-transitory computer-readable storage media of claim 9, wherein the total loss is determined at least partially based on a style loss, the style loss being calculated based on differences between base style feature representations in the set of base style feature representations and stylized feature representations in the set of stylized feature representation, each base style feature representations and stylized feature representation used to calculate a difference correspond to a layer of the ML model.

15. The non-transitory computer-readable storage media of claim 9, wherein denoising at least partially comprises:
executing one of a statistical outlier algorithm and a radius outlier algorithm to identify outliers in the initial stylized object model; and
removing outliers from the initial stylized object model to provide the stylized object model.

16. The non-transitory computer-readable storage media of claim 9, wherein each of the content object model, the style object model, and the stylized object model is provided as a point cloud model and the ML model comprises PointNet++.

17. A system, comprising:
one or more processors; and
a computer-readable storage device coupled to the one or more processors and having instructions stored thereon which, when executed by the one or more processors, cause the one or more processors to perform operations for multi-dimensional shape transfer between digital models, the operations comprising:
processing a content object model through a ML model to provide a set of base content feature representations output from a second set abstraction of the ML model, the content object model representative of a content object;
processing a style object model through the ML model to provide a set of base style feature representations comprising a first style feature representation output from a first set abstraction of the ML model, a second style feature representation output from the second set abstraction of the ML model, and a third style feature representation output from a third set abstraction of the ML model, the style object model representing a style object having a texture that is to be applied to the content object;
initializing an initial stylized object model as the content object model, the initial stylized object model representing a stylized object and being absent the texture of the style object;
executing two or more iterations of an iterative process, each of the two or more iterations comprising:
generating, by the ML model, a set of stylized feature representations for an initial stylized object model, the initial stylized object model having one or more adjusted parameters relative to a previous iteration,
determining a total loss based on the set of stylized feature representations of the initial stylized object model, the set of base content feature representations of the content object model, and the sets of base style feature representations of the style object model, and
determining that the total loss is non-optimized, and in response, initiating a next iteration;
executing an iteration of the iterative process, the iteration comprising determining that the total loss is optimized, and in response providing the initial stylized object model as output of the iterative process; and
denoising the initial stylized object model to provide a stylized object model representing a stylized object comprising at least a portion of content of the content object model and at least a portion of a shape of the style object model.

18. The system of claim 17, wherein the set of base content feature representations comprises local feature representations.

19. The system of claim 17, wherein the set of stylized feature representations comprises a local feature representation.

20. The system of claim 17, wherein the set of base style feature representations comprise a local feature representation.

21. The system of claim 17, wherein the total loss is determined at least partially based on a content loss, the content loss being calculated based on differences between a base content feature representation and a stylized feature representation, each corresponding to a layer of the ML model.

22. The system of claim 17, wherein the total loss is determined at least partially based on a style loss, the style loss being calculated based on differences between base style feature representations in the set of base style feature representations and stylized feature representations in the set of stylized feature representation, each base style feature representations and stylized feature representation used to calculate a difference correspond to a layer of the ML model.

23. The system of claim 17, wherein denoising at least partially comprises:
executing one of a statistical outlier algorithm and a radius outlier algorithm to identify outliers in the initial stylized object model; and
removing outliers from the initial stylized object model to provide the stylized object model.

24. The system of claim 17, wherein each of the content object model, the style object model, and the stylized object model is provided as a point cloud model and the ML model comprises PointNet++.

* * * * *